United States Patent
Lesage et al.

(10) Patent No.: US 11,192,078 B2
(45) Date of Patent: Dec. 7, 2021

(54) FEEDSTOCK INJECTION DEVICE OF AN FCC UNIT, HAVING A LOCALLY LARGER CROSS-SECTION

(71) Applicant: TOTAL RAFFINAGE CHIMIE, Courbevoie (FR)

(72) Inventors: Romain Lesage, Antwerp (BE); Sébastien Decker, Octeville sur Mer (FR); Jean-Christophe Raboin, Chaumont sur Tharonne (FR); Youen Kerneur, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/967,101

(22) PCT Filed: Feb. 4, 2019

(86) PCT No.: PCT/EP2019/052594
§ 371 (c)(1),
(2) Date: Aug. 3, 2020

(87) PCT Pub. No.: WO2019/154747
PCT Pub. Date: Aug. 15, 2019

(65) Prior Publication Data
US 2020/0360882 A1    Nov. 19, 2020

(30) Foreign Application Priority Data
Feb. 8, 2018 (FR) .................................. 1851067

(51) Int. Cl.
*B01J 4/00* (2006.01)
*B01J 8/18* (2006.01)
(Continued)

(52) U.S. Cl.
CPC ............. *B01J 4/002* (2013.01); *B01J 8/1827* (2013.01); *C10G 11/18* (2013.01); *B01J 2204/002* (2013.01); *B01J 2208/00902* (2013.01)

(58) Field of Classification Search
CPC .... B01J 4/002; B01J 8/1827; B01J 2204/002; B01J 2208/00902; B01J 8/24; C10G 11/18
(Continued)

(56) References Cited

U.S. PATENT DOCUMENTS

2007/0290073 A1\* 12/2007 Peterson ............... B05B 7/0416
                                                                239/399
2016/0288075 A1\* 10/2016 Lacroix ................. B05B 7/0012

FOREIGN PATENT DOCUMENTS

WO        2015170034 A1     11/2015

OTHER PUBLICATIONS

International Search Report issued in Application No. PCT/EP2019/052594, dated Apr. 16, 2019; 5 pages.

\* cited by examiner

*Primary Examiner* — Huy Tram Nguyen
(74) *Attorney, Agent, or Firm* — Albert Shung

(57) ABSTRACT

The invention relates to an injection device (10) for atomizing a liquid into droplets using a gas, comprising a hollow tubular body (12) having a longitudinal direction (X). An inner wall (13) defines a first region, referred to as contact region (Z1), and a second region (Z2). The body (12) has an inner cross-section that varies continuously or constantly over the entire length thereof except at the junction between the first and second regions, where the inner wall (13) of the body includes at least one cavity (201) which increases the size of the inner cross-section of the body, said at least one
(Continued)

cavity extending over a predefined length in the longitudinal direction.

9 Claims, 2 Drawing Sheets

(51) Int. Cl.
  *C10G 11/18* (2006.01)
  *B01J 8/24* (2006.01)
(58) Field of Classification Search
  USPC .......................................................... 422/139
  See application file for complete search history.

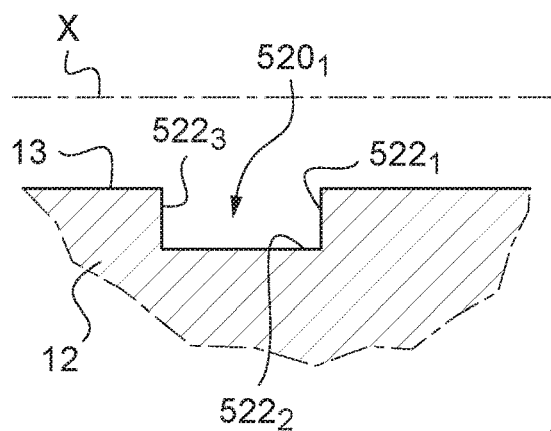
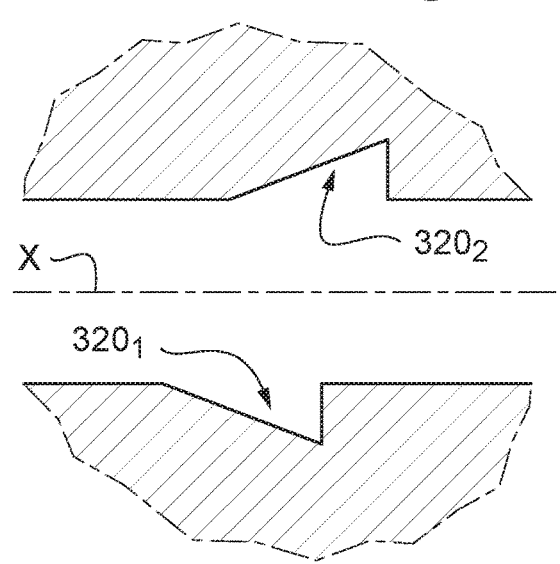
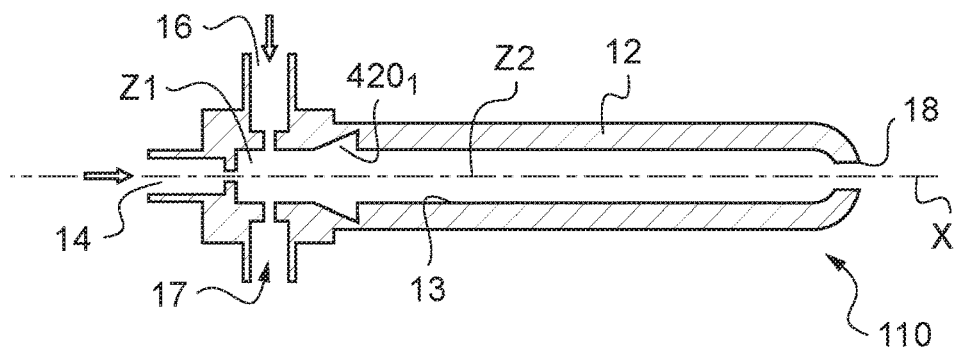
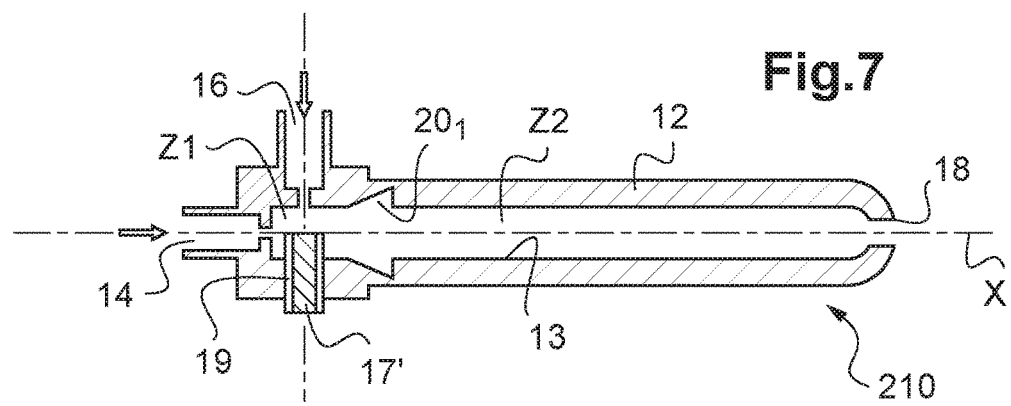

FEEDSTOCK INJECTION DEVICE OF AN FCC UNIT, HAVING A LOCALLY LARGER CROSS-SECTION

CROSS-REFERENCE TO RELATED APPLICATIONS

This application claims the benefit of PCT/EP2019/052594 filed Feb. 4, 2019, which claims priority from FR 1851067 filed Feb. 8, 2018, which are incorporated herein by reference in their entireties for all purposes.

The present invention relates to an injection device, notably to a hydrocarbon charge injection device for a refining unit, particularly a fluid catalytic cracking (FCC) unit.

The liquid hydrocarbon charges processed in refining units are generally brought into contact with a solid catalyst which will encourage the chemical reaction or reactions used to process the charge. In order to improve this contact and maximize the efficiency of the reactions, these liquid hydrocarbon charges are atomized into fine droplets by injection devices. This atomization makes it possible to maximize the area for contact between liquid (liquid hydrocarbon charge) and solid (catalyst), encouraging the transfer of heat and therefore encouraging the vaporization of these hydrocarbons which then react in a gaseous phase on contact with the solid (catalyst). Although there is no real consensus regarding the optimum diameter for the droplets, the desire is generally to form droplets the diameter of which is of the same order of magnitude as the diameter of the particles of catalyst, namely under 200 microns, for example of the order of 50 to 80 microns.

In general, use is made of injection devices referred to as "diphasic", which have a roughly cylindrical hollow body and two inlet openings via which the liquid hydrocarbon charge and an atomizing gas, generally steam, are respectively injected into the body. A contact chamber is formed inside the body, in which chamber the hydrocarbon charge and the atomizing gas are brought into contact in order to atomize the hydrocarbon charge. Once atomized, the hydrocarbon charge is ejected via an outlet opening that opens into the reactor. Each injection device is installed on a wall of the reactor so that one end of the injection device comprising the outlet opening is situated inside the reactor.

Increasingly heavy charges are nowadays being processed in refining units and most especially in FCC units. Atomizing heavy charges involves a significant pressure drop at the injectors, this having the effect of increasing the pressure of the charge fed to the injectors. It is then necessary to use powerful and expensive pumps in order to achieve the desired injector-outlet pressures. Depending on the configuration of the diphasic injection devices, it may also prove necessary to considerably increase the flow rate of atomizing gas in order to atomize heavy charges. However, injecting increasing quantities of atomizing gas increases the overall cost of the processing operation and may also have a negative impact on the efficiency of the reactions by inducing undesired parallel reactions, notably when the atomizing gas is steam. So this is what happens when large quantities of steam are injected into FCC reactors. It is therefore preferable not to increase the flow rate of atomizing gas. Furthermore, injecting large quantities of steam requires oversizing of the effluent separation units downstream of the FCC unit, notably so as to condense the steam, thereby increasing the costs of manufacture.

The lesser use of steam for atomizing the charge allows better control over the distribution of the streams of steam and makes it possible to supply a surplus thereof in sensitive zones of the FCC unit, for example in the valves through which the catalyst flows or alternatively so as to increase the amount of fluidizing gas at the foot of the riser (gas lift), so as to facilitate the circulation of the catalyst Finally, if it is possible to work at a lower pressure, it is then possible to reduce the thicknesses of metal during the manufacture of the charge preheating sets and therefore to reduce manufacturing costs.

Moreover, existing injection devices comprise a mixing chamber that is complex and expensive to produce.

There is a need for injection devices that allow effective atomization. There is also a need for injection devices that give rise only to a small drop in injection pressure, allowing them to be used with heavy charges without the need to increase the flow rate of atomizing gas or the power of the pumps used. Finally, there is a need for injection devices which are less complex and expensive to produce.

The invention seeks to at least partially alleviate the disadvantages mentioned hereinabove. To this end it proposes an injection device configured to atomize a liquid into droplets using a gas, comprising a hollow tubular body extending in a longitudinal direction and of which an internal wall, notably a cylindrical wall, defines a first zone referred to as a contact zone and a second zone situated downstream of the first zone with respect to a direction in which the liquid and the gas circulate inside the body, the latter having:

at least one inlet opening opening into the said first zone, so as to inject a liquid into the first zone, at least one inlet opening opening into the said first zone, so as to inject an atomizing gas into the first zone, at least one outlet orifice situated downstream of the first and second zones, for removing the atomized liquid from the body.

In particular, the second zone may have a length in the longitudinal direction which is from 2 to 10 times greater than the length of the first zone.

According to the invention, the body has an internal cross section that varies continuously or constantly over its entire length except in the region of the join where the first and second zones meet, where its internal wall comprises at least one cavity increasing the dimension of the internal cross section of the body, the said at least one cavity extending over at least a predetermined length in the longitudinal direction.

The particular arrangement of the invention allows the injected liquid to be atomized effectively. In particular, the presence of one or more cavities encourages the dispersion of the liquid inside the body. Furthermore, the body of the device according to the invention may be produced very simply and inexpensively.

The body has an internal cross section that varies continuously, or in other words without any sudden variation and without any shoulder, except in the region of the join. The body may thus have a frustoconical, cylindrical, or similar shape. For preference, the body has a constant internal cross section. It may for example be a cylinder or the like.

The body may advantageously be made as a single piece.

Advantageously, the said predetermined length may be at least equal to a value of 0.05 to 1.2 times the value of the maximum internal dimension of the body perpendicular to the longitudinal direction of the body. This makes it possible to improve the effectiveness of the dispersion of the liquid.

Advantageously, the said at least one cavity may extend over the entire periphery of the body. In particular, a single cavity may be provided.

Advantageously, the said at least one cavity may have a length that can vary along the periphery of the body. In other words, one and the same cavity may have parts of different lengths.

Advantageously, several disjointed cavities may be provided. This makes it easier for the fluids to mix without in so doing increasing the pressure drop, something which may prove particularly advantageous for heavy charges. These disjointed cavities may notably have different lengths.

These cavities may be chosen from cavities distributed on the periphery of the body and cavities spaced apart in the longitudinal direction (X).

The said at least one cavity may have a longitudinal profile defined by at least two adjacent segments. In particular, this profile may be defined by two or three adjacent segments. Each cavity may thus be produced in a simple way.

In one embodiment, an end segment situated on the side of the said at least one outlet orifice is linear and intersects the longitudinal direction X. Advantageously, the segment intersects the longitudinal direction at right angles.

As an alternative or in combination, a segment adjacent to an end segment situated on the side of the said at least one outlet orifice is chosen from a linear segment, a concave curved segment with the concavity facing towards the inside of the body, a convex curved segment with the convexity facing towards the inside of the body. These arrangements allow the stream of fluid to be re-orientated towards the centre of the body while at the same time improving the dispersion.

The profile of each cavity may be defined by just two segments (an adjacent segment and an end segment as defined hereinabove) or by three segments. In the latter instance, another end segment situated on the side of the inlet openings is provided, this latter segment advantageously being linear.

In general, the cavity or cavities have a depth, measured perpendicular to the longitudinal direction of the body, from the internal wall of the body, that is non-zero and less than the wall thickness of the body. Advantageously, this depth is equal at most to ½ of the maximum internal dimension of the body perpendicular to the longitudinal direction of the body. For preference, this depth is equal to at most ¼ of the maximum internal dimension of the body, or even $1/8^{th}$ of this maximum dimension, for example of the order of $1/10^{th}$ of this maximum dimension. This depth may furthermore be variable for one and the same cavity.

The invention is now described with reference to the appended, non-limiting drawings, in which.

FIGS. 5a-d are views in longitudinal section of cavities according to other embodiments;

FIGS. 6 and 7 are a schematic depiction in longitudinal section of other embodiments of an injection device.

In the various figures, elements that are identical bear the same references.

Figure 1:
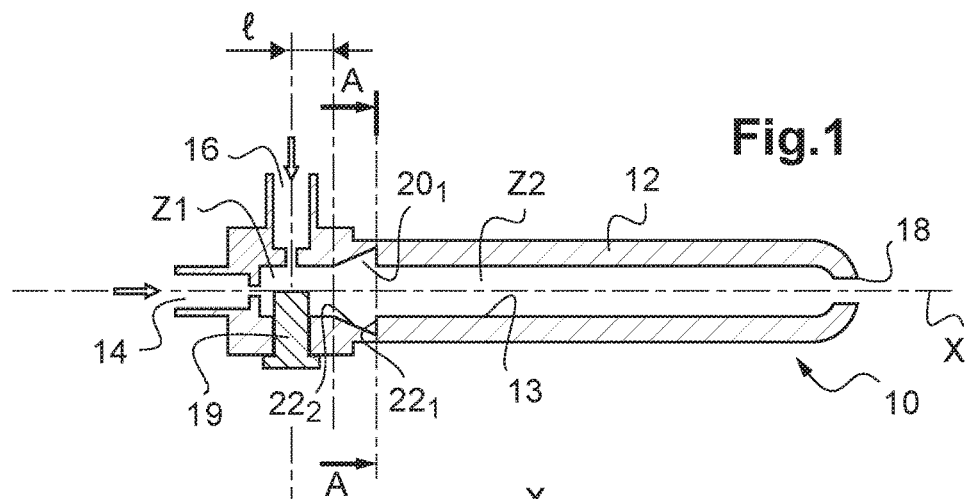
FIG. 1 is a schematic depiction in longitudinal section of an injection device according to one embodiment of the invention.

FIG. 1 schematically depicts an injection device 10 which has a hollow tubular body 12 which extends in a longitudinal direction X.

The body 12 comprises an internal wall 13 which defines a first zone Z1 referred to as contact zone, and a second zone Z2 situated downstream of the first zone Z1 with respect to a direction in which the liquid and the gas circulate inside the body (in this instance from left to right in FIG. 1).

The injection device 10 further comprises:
an inlet opening 14 opening into the first zone Z1, so as to inject an atomizing gas into the first zone,
a second inlet opening 16 opening into the said first zone Z1, so as to inject a liquid into the first zone,
at least one outlet orifice 18 situated downstream of the first and second zones, for removing the atomized liquid from the body.

The first opening 14 is thus intended to be connected to a gas supply pipe, while the opening 16 is intended to be connected to a liquid supply pipe. It will be noted that the first opening 16 may project inside the zone Z1.

The injection device 10 further comprises a target 19 extending in projection from the internal wall 13 in the first zone Z1, facing the liquid introduction opening 16 and through the passage of the gas entering via the opening 14. As can be seen in FIG. 1, the target 19 thus extends in the axis of the opening 16. The axis of the opening 16 corresponds to the direction of injection of the liquid through the opening 16. In general, this axis is situated equidistant from the walls of this opening 16, as can be seen in FIG. 1. The openings are generally cylindrical and thus the axis of the opening corresponds to the axis of symmetry of the opening 16. The axis of the opening 14 corresponding to the direction of injection of the atomizing gas generally coincides with the axis of the body. Thus, the term "axis of an opening" is understood to mean the direction of injection of the fluid intended to be introduced through this opening which corresponds to the longitudinal axis of the opening.

Inside the body 12, the fluids circulate from the inlet openings 14-16 towards the outlet orifice 18.

Here, the first zone Z1 and the second zone Z2 take the form of a straight internal pipe connecting the first inlet opening 14 to the outlet orifice 18 in an axial direction of the said body. This internal pipe in this embodiment has a constant internal diameter. The invention is not, however, limited by this embodiment. The internal cross section of this pipe (in other words of the body) could vary continuously or be constant over the entire length of the pipe (i.e. of the body), without, however, being circular.

In the embodiment depicted, the body 12 is a cylinder, in other words the internal wall 13 here is cylindrical, its axis coinciding with the longitudinal direction X of the body.

The liquid is sprayed against the target 19 as soon as it enters the first zone Z1 via the opening 16. The jet of liquid is broken open and carried in the form of droplets by a stream of atomizing gas introduced at high speed through the opening 14. The atomization of the liquid in this type of injector 10 takes place in two stages. A first part of the atomization occurs at the target 19 as the jet of liquid is broken open. The second part of the atomization occurs at the reduced-diameter outlet orifice 18, where the narrowing in diameter accelerates the fluids. In other words, the injection device is configured to atomize a liquid into droplets. To this end, in a manner which is known and as described above, it has an outlet orifice with a diameter which is reduced in relation to the dimensions of the body and a particular arrangement of the inlet orifices for the liquid and the atomizing gas. In this particular embodiment, the target arranged opposite the inlet opening for the liquid, in the axis of said opening, also participates in the atomization.

According to the invention, the body 12 has an internal cross section that varies continuously or constantly over its entire length except in the region of the join where the first and second zones Z1, Z2 meet, where its internal wall 13 comprises at least one cavity $20_i$ (where i, the number of cavities, is a non-zero integer number) increasing the dimension of the internal cross section of the body. The cavity or cavities $20_i$ extend over a predetermined length in the longitudinal direction.

Because this cavity locally increases the diameter of the internal wall 13, it disrupts the movement of the fluid, encouraging mixing. In particular, the presence of a cavity or cavities makes it possible to avoid the formation of a film of liquid on the wall by bringing the liquid back into the axis of the stream of gas.

One or more cavities may be provided.

Figure 2A:
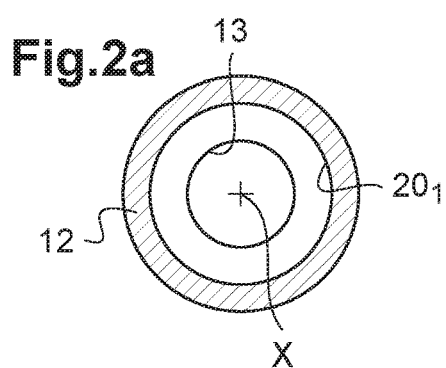
FIG. 2a is a view in section on AA of a cavity of FIG. 1, according to one embodiment.

The injection device 10 may thus comprise a single cavity $20_1$, as depicted in FIG. 2a, situated at the line of section A-A of FIG. 1. This cavity $20_1$ extends over the entire periphery of the internal wall 13. Its length (in the longitudinal direction X) is 0.05 to 1.2 times the value of the maximum internal dimension of the body perpendicular to the longitudinal direction of the body, or in other words times the value of the internal diameter of the body in this example.

Figure 2B:
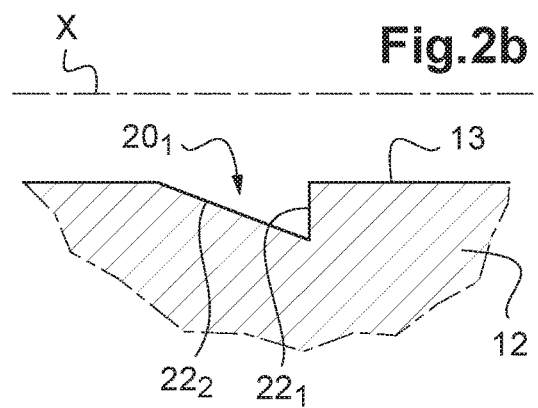
FIG. 2b is a view in longitudinal section of a cavity according to one embodiment.

In this example, the cavity has a longitudinal profile defined by two adjacent segments $22_1$, $22_2$ as visible in FIG. 1 and in FIG. 2b. An end segment $22_1$ is situated on the side of the outlet orifice 18. In this instance it is linear and intersects the longitudinal direction at a right angle. The adjacent segment $22_2$ connects the end segment to the internal wall 13. Thus, the depth of the cavity $20_1$ (dimension measured perpendicular to the longitudinal direction, from the internal wall 13), increases in the direction in which the fluid circulates (from left to right in FIGS. 1 and 2b). The fluid thus follows the internal wall 13, enters the cavity $20_1$ by passing alongside the segment $22_2$, then, having reached the end of the cavity, impinges on the end segment $22_1$, thereby creating turbulence while at the same time returning it towards the centre of the body 12.

It will also be noted that the length of the cavity is dependent on the inclination of the segment $22_2$ with respect to the longitudinal axis X.

The figures described hereinafter depict other embodiments which differ from those previously described in terms of the number and/or shape of the cavities. In these figures, the cavities are denoted by the reference "$20i$" or "J$20i$", the suffix "i", a non-zero whole number, representing the number of cavities, embodiments differing from those previously described being identified by J (a whole number from 1 to 5 in the examples).

In the example depicted in FIGS. 1, 2a, 2b, just one single cavity has been depicted, the depth of which is constant over the entire periphery of the body (see FIG. 2a).

The invention is not, however, limited to this particular embodiment.

Figure 3:
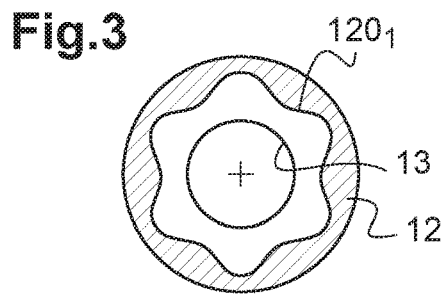
FIGS. 3 and 4 are views in section similar to those of FIG. 2a according to other embodiments.

In particular, the depth of a cavity may be variable over the periphery of the body. Thus, FIG. 3 depicts a cavity $120_1$ the depth of which is variable over its periphery.

Figure 4:
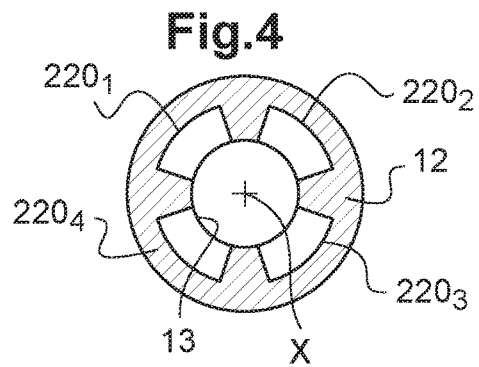

The embodiment of FIG. 4 shows 4 disjointed cavities $220_1$, $220_2$, $220_3$, $220_4$, spaced apart radially, or in other words distributed over the periphery of the body 14. The longitudinal profile of each cavity may be such as that depicted in FIG. 2b or such as those described hereinafter with reference to FIGS. 5a, 5b and 5c. It is also possible to conceive of disjointed cavities having different longitudinal profiles.

Figure 5A:
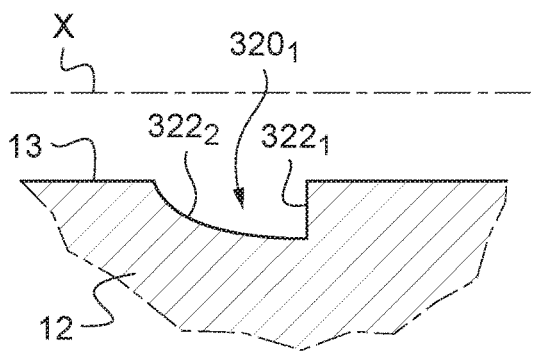

Thus FIG. 5a depicts a longitudinal profile of a cavity $320_1$ defined by two adjacent segments $322_1$, $322_2$, as in the example of FIG. 2b. This embodiment differs from that depicted in FIG. 2b only in terms of the shape of the adjacent segment $322_2$ which has a convex shape the convexity of which faces toward the inside of the body 14.

Figure 5B:
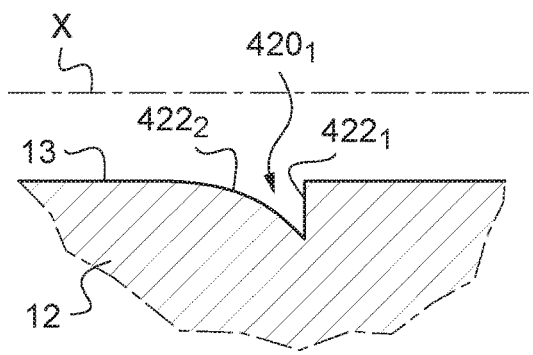

FIG. 5b depicts a longitudinal profile of a cavity $420_1$ defined by two adjacent segments $422_1$, $422_2$, as in the preceding example. This embodiment differs from the preceding one only in terms of the shape of the adjacent segment $422_2$ which has a concave shape the concavity of which faces toward the inside of the body 14.

In the example depicted in FIG. 5c, a cavity $520_1$ is defined by three adjacent segments $522_1$, $522_2$, $522_3$. Each segment here is linear, the two end segments $522_1$, $522_3$ being perpendicular to the longitudinal direction, the central segment $522_2$ being parallel thereto. Of course it is possible for these three segments not to be perpendicular to one another.

In the example depicted in FIG. 5d, two distinct cavities, with the same profile as the one depicted in FIG. 2b are provided: in this instance they are offset in the longitudinal direction X.

It will thus be appreciated that it is possible to modulate the cavity shape and/or the number and distribution of the cavities in order to improve the dispersion and/or the reorientation of the stream of fluid towards the inside of the body.

In particular, the various linear segments described hereinabove could be replaced with curved segments, or the segments could be joined together by a curve rather than a sharp corner.

When several disjointed cavities are provided, provision may further be made for these to extend not parallel to the longitudinal direction but in helical directions, something which may make it possible to set the stream into rotation inside the body.

When several disjointed cavities are provided, they may have different lengths. Similarly, a single cavity may have different lengths.

Whatever the embodiment, the cavity or cavities may have a radial dimension or depth (perpendicular to the longitudinal direction X) that is relatively small, for example less than $1/8^{th}$ of the diameter of the internal wall 13, or even of the order of $1/10^{th}$ of this diameter. This depth may differ from one cavity to another or one and the same cavity may have a depth that is variable, notably longitudinally.

Whatever the embodiment, the cavity or cavities are arranged between the first and second zones Z1, Z2. Typically, the second zone has a length (in the longitudinal direction X) 2 to 10 times greater than the length of the first zone. The cavity or cavities may be situated at a distance "1" from the axis of the opening 16, which may be at most 5 times or 2 times or 1 times the value of the maximum internal dimension of the internal cross section of the body (in this instance the diameter) or even less than the maximum internal dimension of the internal cross section of the body (in this instance the diameter), at the level of the first zone, for example at a distance corresponding to ¾ of this maximum internal dimension (for the sake of clarity, the figures are not drawn to scale). In particular, one edge of the cavity situated on the side of the opening 14 may be situated at this distance 1, as can be seen in FIG. 1.

The aforementioned cavities may be produced as one piece with the body 12, for example by moulding or machining.

When several cavities are present, they may be identical or different, it being possible to combine the various shapes and arrangements of cavities described hereinabove.

The presence of one or more cavities in the internal wall has been described with reference to an injection device of the so-called impact type. The invention is not, however, limited this particular type of injection device. Other injection devices may be used, such as those described with reference to FIGS. 6 and 7.

Thus, FIG. 6 depicts an injection device 110 which differs from that of the embodiment depicted in FIG. 1 only in that the target 19 is replaced by an opening 17 intended to be connected to a liquid duct.

The jets of liquid entering via the openings 16 and 17 are sprayed towards one another and strike one another on a longitudinal line extending inside the body, in this instance the longitudinal axis X. In the example, the jets of liquid strike one another substantially at the point I. The burst jets of liquid are carried away in the form of droplets by a stream of atomizing gas introduced at high speed via the opening 14. Atomization of the liquid takes place in two stages. A first part of the atomization occurs at the point I by impact of the jets with one another. The jets of liquid thus burst are sheared by the incoming gas introduced through the opening 14 The second part of the atomization occurs at the reduced-diameter outlet orifice 18, where the narrowing in diameter accelerates the fluids. In other words, the injection device is configured to atomize a liquid into droplets. To this end, in a manner which is known and as described above, it has an outlet orifice with a diameter which is reduced in relation to the dimensions of the body and a particular arrangement of the inlet orifices for the liquid and the atomizing gas. In the embodiment described below with reference to FIG. 7, a target is further situated inside one of the inlet openings for the liquid.

In the example depicted, the two openings 16, 17 face one another (their axes coincide). However, it is possible to conceive of a higher number of openings for the liquid, for example 3 or 4 or even more, arranged in such a way that the jets of liquid strike one another on the axis X in the stream of gas entering via the opening 14.

This type of injection device is described in document WO2015/170034A1 (incorporated by reference).

The injection device 110 depicted in FIG. 6 comprises a single cavity $420_1$, like the one described with reference to FIG. 5b.

FIG. 7 depicts an injection device 210 which differs from that of the embodiment depicted in FIG. 1 only in that the target 19 is surrounded by an opening 17' intended to be connected to a gas duct.

The invention claimed is:

1. An injection device configured to atomize a liquid into droplets using a gas, comprising a hollow tubular body extending in a longitudinal direction (X) and of which an internal wall defines a first zone referred to as a first contact zone (Z1) and a second contact zone (Z2) situated downstream of the first zone with respect to a direction in which the liquid and the gas circulate inside the body, this second contact zone (Z2) having a length in the longitudinal direction (X) which is from 2 to 10 times greater than the length of the first contact zone (Z1), the body having:
    at least one inlet opening opening into the first contact zone (Z1), so as to inject a liquid into the first zone,
    at least one inlet opening opening into the first contact zone (Z1), so as to inject an atomizing gas into the first zone,
    at least one outlet orifice situated downstream of the first and second zones, for removing the atomized liquid from the body,
    characterized in that the body has an internal cross section that varies continuously or constantly over its entire length except in the region of the join where the first and second zones meet, where its internal wall comprises at least one cavity increasing the dimension of the internal cross section of the body, the at least one cavity extending over at least a predetermined length in the longitudinal direction.

2. The injection device according to claim 1, characterized in that the predetermined length is at least equal to a value of 0.05 to 1.2 times the value of the maximum internal dimension of the body perpendicular to the longitudinal direction of the body.

3. The injection device according to claim 1, characterized in that the at least one cavity extends over the entire periphery of the body.

4. The injection device according to claim 1, further comprising a plurality of disjointed cavities, wherein the plurality of disjointed cavities comprise cavities distributed over the periphery of the body and cavities spaced apart in the longitudinal direction (X).

5. The injection device according to claim 1, characterized in that the at least one cavity has a longitudinal profile defined by at least two adjacent segments.

6. The injection device according to claim 5, characterized in that an end segment situated on the side of the at least one outlet orifice is linear and intersects the longitudinal direction (X), notably at right angles.

7. The injection device according to claim 5, characterized in that a segment adjacent to an end segment situated on the side of the said at least one outlet orifice is chosen from a linear segment, a concave curved segment with the concavity facing towards the inside of the body, a convex curved segment with the convexity facing towards the inside of the body.

8. The injection device according to claim 7, characterized in that the longitudinal profile is formed of the end segment and of the adjacent segment.

9. The injection device according to claim 1, characterized in that the at least one cavity has a depth, measured perpendicular to the longitudinal direction of the body, that is non-zero and less than the wall thickness of the body, equal to at most ½ of a maximum internal dimension of the body perpendicular to the longitudinal direction of the body.

* * * * *